United States Patent [19]

Cobaugh et al.

[11] 3,978,569

[45] Sept. 7, 1976

[54] APPARATUS FOR APPLYING SOLDER RINGS TO TERMINAL POSTS

[75] Inventors: Robert Franklin Cobaugh, Elizabethtown; James Ray Coller, Mechanicsburg; Attalee Snarr Taylor, Palmyra, all of Pa.

[73] Assignee: AMP Incorporated, Harrisburg, Pa.

[22] Filed: June 17, 1975

[21] Appl. No.: 587,750

[52] U.S. Cl. .......................... 29/203 DS; 29/203 DT; 29/509; 228/14; 228/17; 228/41; 228/245; 228/255
[51] Int. Cl.² .......................................... B23K 1/20
[58] Field of Search ........ 29/203 D, 203 B, 203 DS, 29/203 DT, 509; 228/245, 255, 136, 14, 15.1, 17, 41, 43

[56] References Cited
UNITED STATES PATENTS

| | | | |
|---|---|---|---|
| 2,426,623 | 9/1947 | Larsen | 29/203 D |
| 3,750,265 | 8/1973 | Cushman | 228/255 |
| 3,886,650 | 6/1975 | Cobaugh et al. | 29/203 DT |
| 3,913,818 | 10/1975 | Osipov | 228/41 |

Primary Examiner—Carl E. Hall
Attorney, Agent, or Firm—William J. Keating, Donald W. Phillion

[57] ABSTRACT

An apparatus consisting of a pair of rollers with tangentially meeting perimeters for crimping successive portions of a continuous strip of solder into rings around a strip of terminal posts carried in parallel manner upon a common carrier strip. The roller perimeters each contain a circumferential track of crimping ridges which are both axially and angularly positioned to coincide with corresponding ridges on the other roller to crimp said solder strip around each post on the strip of terminal posts, both strips being simultaneously passed between the crimping tracks on said rollers. Each roller also comprises a circumferential track of spur-type gear teeth, the two tracks being axially offset on opposite sides of said crimping tracks and having bottom lands (the troughs of the teeth) which coincide when the teeth pass through the common tangential or pitch plane of the rollers.

12 Claims, 5 Drawing Figures

APPARATUS FOR APPLYING SOLDER RINGS TO TERMINAL POSTS

BACKGROUND OF THE INVENTION

This invention relates generally to an apparatus for placing solder rings around terminal posts for subsequent soldering to a printed circuit board, for example, and more particularly, it relates to an apparatus for cold crimping successive portions of a continuous strip of solder into rings of doughnuts around a plurality of terminal posts which are supported in parallel relationship upon a common carrier strip.

One well known way of securing terminal posts through holes provided therefor in printed circuit boards is to place a doughnut-shaped ring of solder around the terminal post which is then, or has previously been, inserted in a hole provided therefore in a substrate, such as a printed circuit board. The board is usually positioned such that the solder doughnuts rest against the board and usually against a conductive pad or area formed on the board. Heat is then applied to melt the solder rings, thereby securing the posts to the board and making electrical contact between the posts and the conductive surfaces on the board. The placing of the solder rings upon the terminal posts has been done a number of ways, including a manual operation whereby a human operator places the solder rings individually on the posts after or before the posts have been inserted into a printed circuit board.

An improved method and apparatus for applying solder rings to terminal posts which are connected in parallel arrangement to a common carrier strip is disclosed in co-pending application Ser. No. 466,322 filed May 2, 1974, by Robert F. Cobaugh and James R. Coller, entitled "Method and Apparatus For Prescrimping Solder Rings On Electrical Terminal Posts", now Pat. No. 3,886,650, and incorporated herein by reference.

In the afore-mentioned application the terminal posts are first passed through an oven in which they are heated. Subsequently, the heated terminal posts and also a strip of solder having a substantially rectangular cross-sectional configuration are passed together through a first pair of rollers whose perimeters are tangential and configured so that the heated terminal posts are caused to be pressed against one edge of the strip of solder. The heated posts melt their way into the solder strip until the posts are approximately half-way through said solder strip. The posts, with the solder strip now attached thereto, is passed through a second pair of rollers whose perimeters are tangential and configured so that the solder strip is crimped or pinched at its edges, i.e., in a direction parallel with the major surfaces of said solder strip, in-between adjacent terminal posts to cold work the solder strip into semi-completed rings around each terminal post. The pinching or crimping of the solder strip is almost sufficient to completely break the strip of solder. Thus, the resultant product is the row of terminal posts still retained on the carrier strip at one end and having the semi-complete solder rings formed around each terminal post with each of said semi-complete solder rings joined to the adjacent solder rings by a thin, neck-like element of solder.

While the foregoing method and apparatus performs very well and is employed commercially, it would mark improvement in the art to provide a simplified apparatus requiring less structure and which does not require heating of the terminal posts.

BRIEF STATEMENT OF THE INVENTION

Accordingly it is a primary object of the invention to provide an apparatus for applying solder rings to terminal posts on a common carrier strip without preheating the terminal posts.

It is another primary purpose of the invention to apply solder rings to terminal posts secured to a common carrier by means of a single pair of rollers.

It is a third aim of the invention to apply solder rings to terminal posts connected to a common carrier without preheating the solder posts and employing only a single pair of rollers.

It is a fourth purpose of the invention to apply solder rings to terminal posts carried on a common carrier strip using only a single pair of rollers which function to receive both the terminal posts and a pre-cut solder strip and then to cold work the strip of solder into semi-complete rings around each of the terminal posts as said posts pass through said pair of rollers.

A fifth aim of the invention is the improvement of apparatus for the application of solder rings to terminal posts by automated means generally.

In accordance with one form of the invention there is provided an apparatus for cold working a strip of solder, preferably pre-notched and usually of rectangular cross-section, into semi-complete rings around each terminal post of a series of terminal posts carried in parallel manner upon a common carrier strip. The apparatus comprises a pair of rollers whose circumferential perimeter is divided into several circumferential strips, or tracks. A first circumferential track on each of the rollers comprise a series of spaced ridges which are preferably parallel with the axes of rotation of the rollers and which have a concave surface or area between adjacent ridges. Each of the ridges on the circumferential tracks of each of the rollers meet, or nearly meet, a corresponding ridge of the other roller at the pitch plane where the rollers tangentially meet to pinch or crimp a strip of solder passing therebetween around individual terminal posts also passing therebetween parallel with the axes of rotation of the rollers and perpendicularly to the longitudinal axis of the strip of solder.

The rollers each also have a set of spur-like gears spaced around second circumferential tracks thereof. The circumferential tracks containing such spur gears do not lie in the same general plane of rotation however. More specifically, the spur gears of said first roller lie immediately adjacent a first side of said first circumferential tracks containing the ridges and the spur gears of the second roller lie immediately adjacent the second or other side of said circumferential tracks containing the ridges; the spur gears on each roller being individually positioned in angular relationship with each other so that the top land portions of the gear teeth face each other as they pass through the pitch plane rather than having a conventional meshing relationship if they were in a common plane.

The working depth of the two tracks of spur gears, if they were in a common plane with respect to each other, preferably is not less than a thickness of a post being passed therethrough.

The bottom lands of adjacent teeth of a first roller passing through said pitch plane lie substantially midway between adjacent ridges of the other roller, to thereby entrap a terminal post between the bottom land of an opposing pair of teeth on said first and second rollers as said bottom land passes through said pitch plane.

In accordance with a feature of the invention portions of the perimeter of the two rollers comprise sprocket means which engage perforations in the carrier strip holding the terminal posts to drive the strip of terminal posts carried thereon between said rollers in an angular relationship with said rollers so that they pass through the pitch plane in synchronism with the bottom lands of said spur-like teeth.

In accordance with another feature of the invention, other portions of the perimeter of said rollers are configured to maintain said terminal posts in parallel relation with each other as they pass between said rollers and said strip of solder is cold worked around predetermined portions of said post.

In accordance with still another feature of the invention there is provided a means for applying flux to the general area where the solder rings are crimped around said terminal posts, which flux performs the function of protecting the surfaces of and holding together the solder rings and the terminal posts and also providing the solder flux utilized in the solder reflow process when the solder rings are melted to secure the posts to a plated through hole in a printed circuit board.

BRIEF DESCRIPTION OF THE FIGURES

The above-identified and other objects and features of the invention will be more fully understood from the following detailed description thereof when read in conjunction with the drawings in which.

DETAILED DESCRIPTION OF THE INVENTION

Figure 1:
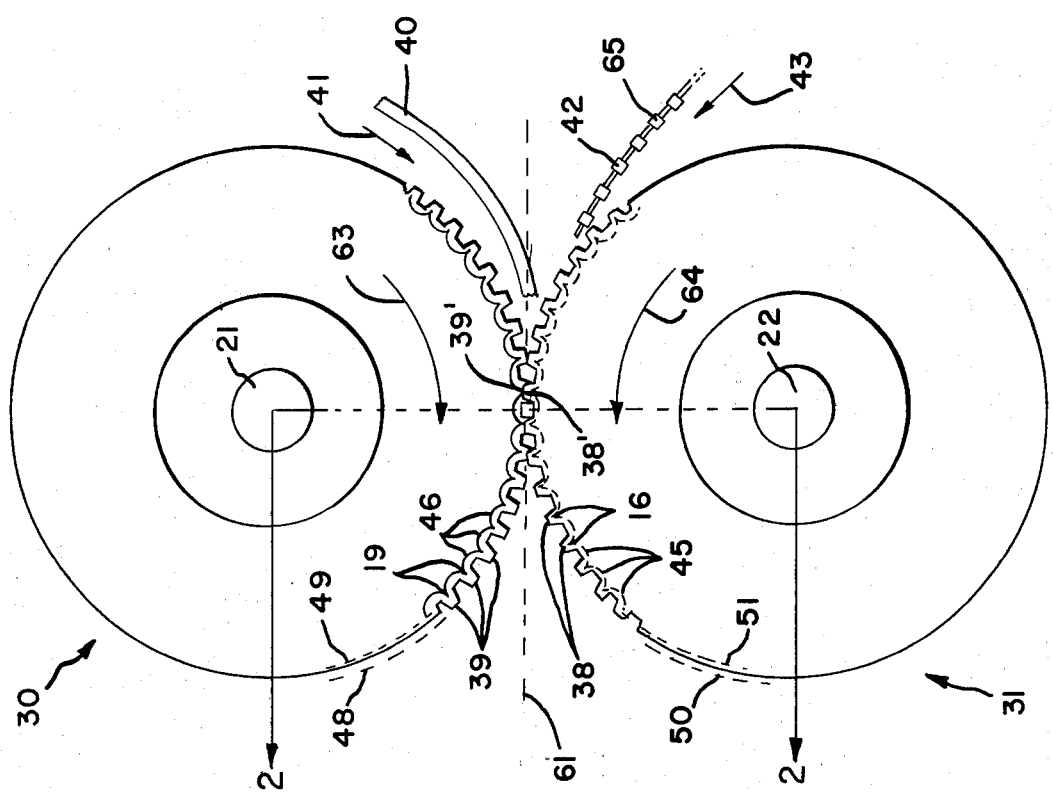
FIG. 1 is a diagram showing the side view of the system including two rollers and also showing generally the action of the various tracks of gears and other forming elements on the two rollers upon the strip of solder and the strip of posts being fed simultaneously in-between said two rollers in the area of said pitch plane.

Referring now to FIG. 1 there is shown a broad schematic diagram of the system including the two rollers 30 and 31 which meet in a generally tangential manner along a pitch plane represented generally by the dotted line 61, which plane is perpendicular to the plane of the drawing.

The two rollers 30 and 31 rotate on shafts 21 and 22 which are mounted at their ends in suitable bearings which are supported in a suitable frame, neither of which is shown in FIG. 1. The two rollers 30 and 31 rotate respectively in the direction of the arrows 63 and 64 to receive a strip of solder 40 and a strip of terminal posts 42. The solder strip 40 and the terminal posts 42 are supplied in-between the rotating rollers 30 and 31 in the direction of the arrows 41 and 43, respectively.

The crimping of the solder strip 40, which preferably is rectangular in cross-sectional configuration, around the individual terminal posts, such as the terminal post 65 in strip 42, is accomplished by the action of circumferential crimping tracks identified generally by reference characters 49 and 51 on rollers 30 and 31, and containing crimping ridges, such as ridges 19 and 16, and also the action of the adjacent spur gear tracks identified generally by reference characters 48 and 50 on rollers 30 and 31. Individual teeth on spur gear tracks 48 and 50 are identified by reference characters 39 and 38, for example. The two particular spur gear teeth lying in the pitch plane 61 are identified by reference characters 39' and 38' on rollers 30 and 31, respectively.

Figure 5:
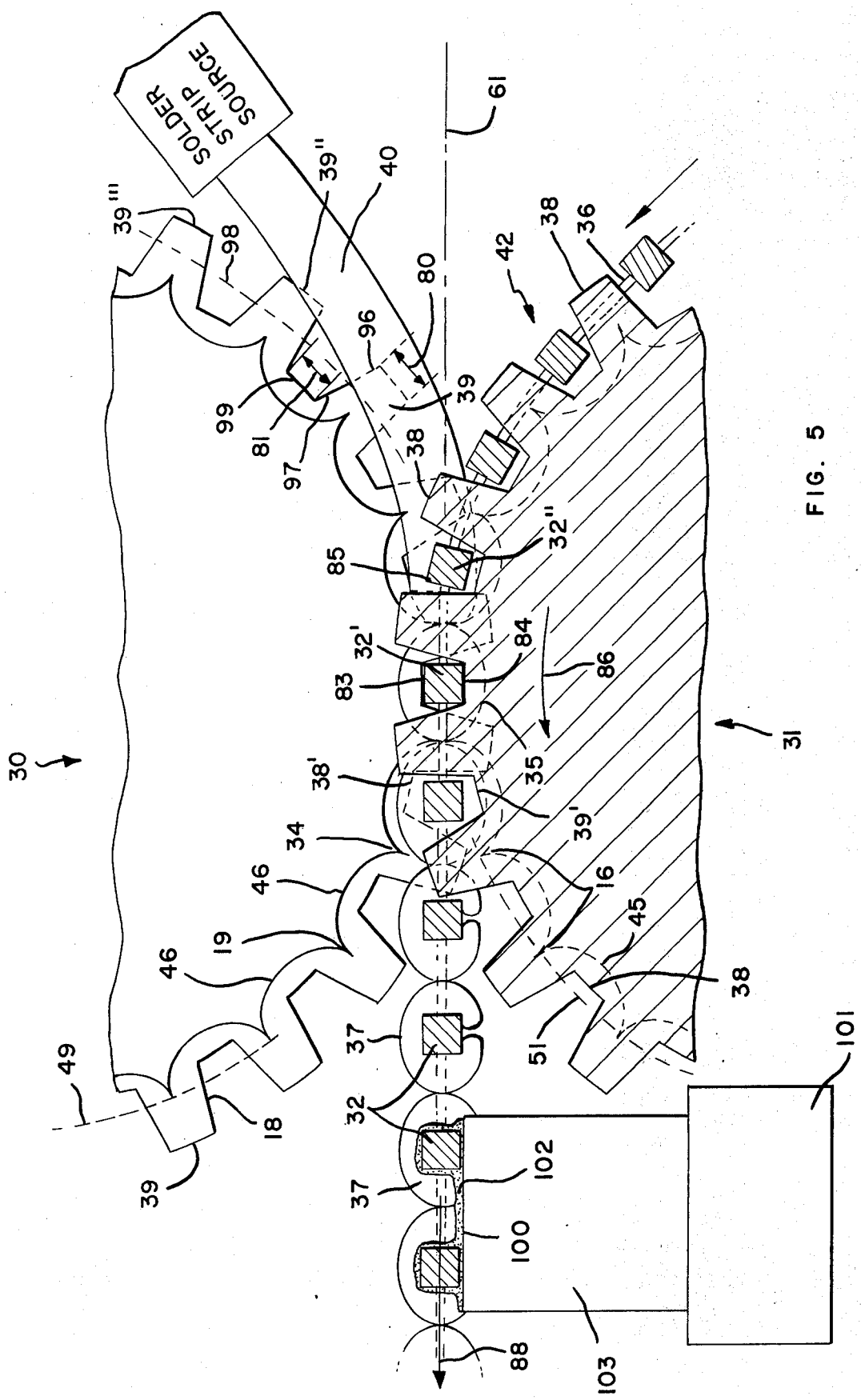
FIG. 5 shows a detailed profile of the interaction of the two tracks of spur gears and the crimping tracks therebetween upon the strips of terminal posts and solder being passed therebetween.

Before proceeding further with a discussion of the system, definitions of certain portions of spur-like gears will first be set forth. Reference is made to FIG. 5 which shows a much enlarged portion of the area where the two rollers 30 and 31 approach each other tangentially along the pitch plane 61. Referring specifically to the two adjacent spur gears 39'' and 39''' in FIG. 5 there is an area 99 therebetween which has a width designated by reference character 81. This area or surface 99 is defined as the "bottom land" in a spur gear train. The area 80 of the gear 39'' is known as the "top land" area. The dotted curved line 98 is known as the pitch circle. That surface area 96 of tooth 39'' which lies outside, that is to the right of pitch circle 98 in FIG. 5, is known as the "face" of the tooth. The surface area 97 of tooth 39'', which lies to the left of the pitch circle 98 in FIG. 5, and faces the adjacent tooth 39''' is known as the "flank" of the tooth.

It can be seen generally from FIG. 5 that the solder strip 40 and the strip of terminal posts 42 are supplied simultaneously and together between the rollers 30 and 31. A specific terminal post 32' is shown trapped at a given point in time between the bottom lands 84 and 83 of the spur gear teeth on rollers 30 and 31, respectively, with the solder ring substantially completely formed therearound. At the same time crimping tracks 49 and 51 are crimping solder strip 40 around the next terminal post 32''.

A more detailed discussion of the structure of FIG. 5 will be contained herein later. At this time however, reference is again made to the structure of FIGS. 1 and 2 for a continued general discussion of the invention.

Figure 2:
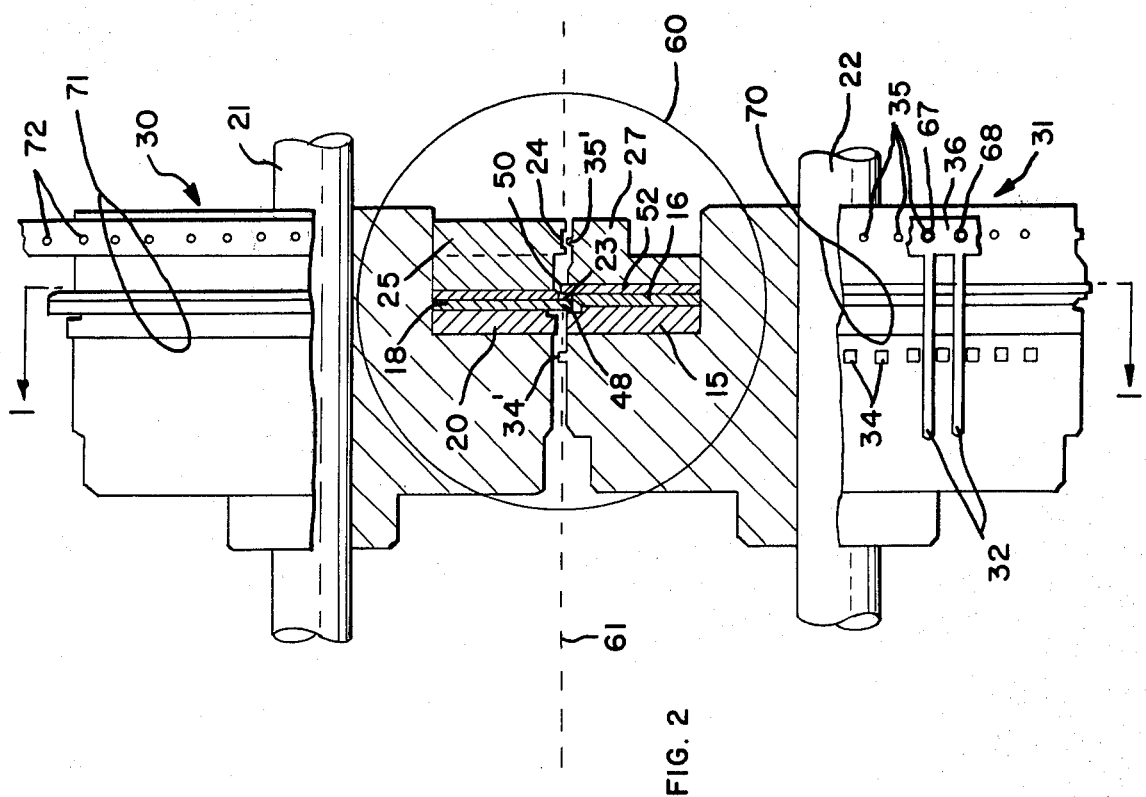
FIG. 2 is a view of the two roller assembly from a direction normal to the rotational axes of the rollers with a sectional view of a portion of FIG. 1 taken through the plane 2—2, and showing the relation of the two spur gear tracks and the tracks containing the ridges positioned therebetween.

Referring now to FIG. 2 it can be seen that the spur gear tracks 48 and 50 do not lie in the same plane, but rather are offset from each other on opposite sides of third and fourth crimping tracks 4 and 51, which are positioned circumferentially around rollers 30 and 31, respectively. These third tracks 49 and 51 contain ridges, such as ridges 19 and 16 (FIG. 1), on rollers 30 and 31, with concave portions such as concave portions 46 and 45 in-between each pair of adjacent ridges.

Ridges 16 and 19 are generally parallel with the axes of rotation of rollers 30 and 31 and are spaced equidistant apart around the circumferences of the rollers 30 and 31. Further, the ridges 16 and 19 are angularly positioned around the perimeters of rollers 30 and 31 so that each ridge of each wheel will pass through the pitch plane 61 opposite a ridge on the other roller, thereby producing a pinching or crimping effect on the strip of solder 40 passing therebetween.

As will be more clearly understood from the following paragraphs the strip of solder 40 passes through the gap 23 (FIG. 2) between crimping tracks 49 and 51 along with a predetermined portion of the posts 42. In FIG. 2 it can be seen that each of the posts pass between rollers 30 and 31 transversely, with the length of the post being parallel to the roller shafts 21 and 22. On the other hand, the strip of solder 40 is fed directly, i.e., lengthwise into the gap 23, preferably with the long side of its rectangular cross-sectional configuration being perpendicular to the shafts 21 and 22. The spur gear tracks 48 and 50 in FIG. 2 function to contain the solder strip 40 within the gap 23 and permit the ridges 16 and 19 on the crimping tracks 49 and 51 to crimp the solder at points in-between adjacent posts and thereby form the solder rings around said adjacent terminal posts.

It is to be noted that the teeth of the spur gear tracks 48 and 50 would not mesh even if they were to lie in the same plane. More specifically, the angular relationship between the individual teeth of spur gear tracks 48 and 50 is such that they are removed 180° from mesh position, i.e., the top lands of the individual teeth of the spur gear tracks 48 and 50 pass through the pitch plane at the same time and coincide with each other. Since they are axially offset, however, tracks 48 and 50 act as sidewalls which contain the solder strip 40 therebetween. The specific angular relationship of the individual teeth of the spur gear tracks 48 and 50 will be understood more clearly from FIG. 5 when it is described in detail later herein.

The terminal posts, such as terminal posts 32 shown in FIG. 2, are carried on a common carrier strip 36 which has perforations such as perforations 67 and 68 formed therein. These perforations 67 and 68 are spaced apart equal distances to mesh with sprocket pins, such as sprocket pins 35 spaced around a given axially positioned track on the perimeter of roller 31.

It is to be understood that the terminal posts 32 and the short section of carrier strip 36 are included in FIG. 2 merely for illustrative purposes and would not, in fact, be present on that portion of the roller 31 as shown in FIG. 2. In actual practice a strip of terminal posts leaves the rollers 30 and 31 generally along pitch plane 61 in FIG. 1, fed outwardly to the left in FIG. 1, and then taken up on an appropriate take-up means, such as a reel (not shown).

Referring again to FIG. 2, and the small section of terminal posts 32 shown thereon, it can be seen that small separators 34 are provided on still another track of roller 31 to separate the terminal posts 32 and to keep said posts 32 in a parallel, aligned position with respect to each other.

A single separator 34' is shown in profile in FIG. 2, as well as a single sprocket pin 35'. The separator 34' and the sprocket pin 35' are the particular separators and sprocket pins lying in the pitch plane at a given time. The group of solid parallel lines 70 represent generally the various tracks shown in detail along the pitch plane 61 of FIGS. 1 and 2. Similarly, the solid lines 71 represent generally the tracks of roller 30 which are shown in more detail in the pitch plane of FIG. 2. The elements 72 in roller 30 of FIG. 2 represent indentations or embossments with which the sprocket pins 35 of roller 31 mesh to drive the carrier strip 36 of terminal posts 32.

Figure 3:
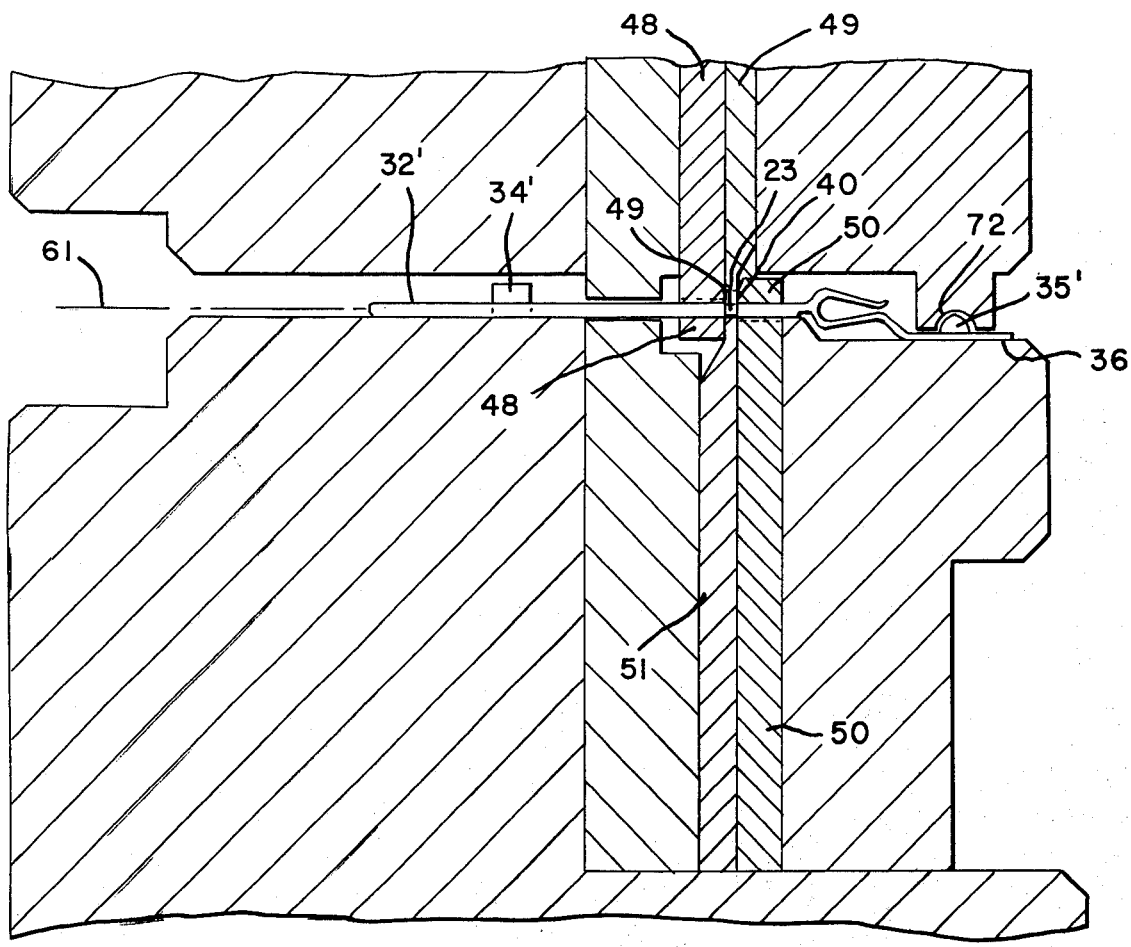
FIG. 3 is an enlarged view of the particular portion of the structure of FIG. 2 showing the two tracks containing the spur gears and the two tracks containing the ridges positioned therebetween and a terminal post entrapped between the two spur gear tracks.

Referring now to FIG. 3 there is shown an enlarged portion of the structure of FIG. 2 enclosed in the circular area 60. There is also shown a post 32' lying in the pitch plane 61 with one end of post 32' being aligned by alignment member 34' and the other end being retained by carrier strip 36 which is held in sprocket pin 35' which in turn mates with embossment 72 in roller 30.

Figure 4:
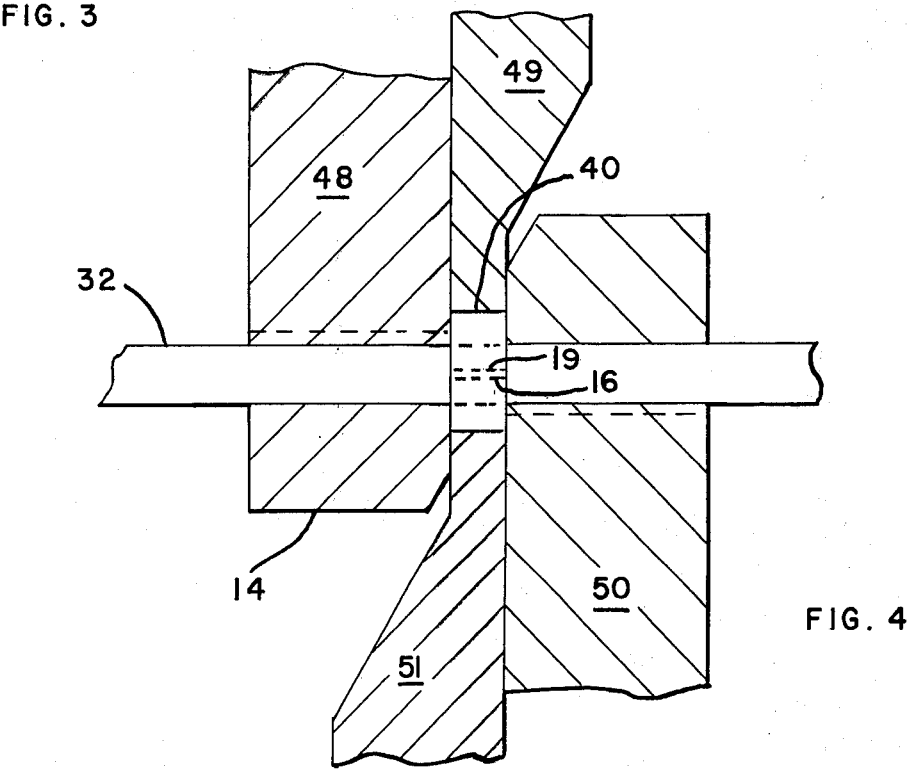
FIG. 4 is an even more enlarged view of the central portion of the structure of FIG. 2 showing only the spur gear tracks and the crimping tracks.

Also shown in FIG. 3 is a cross-sectional view of a strip of solder 40 which is being cold worked around a portion of the post 32' within the gap 23 defined by two teeth of the two spur gear tracks 48 and 50 and the bottoms of the crimping tracks 49 and 51. An even more enlarged view of the central portion of the structure of FIG. 3 is shown in FIG. 4, with corresponding parts being identified by the same reference characters.

Referring now to FIG. 5 there is shown a detailed sketch of the interaction of the two tracks of spur gear teeth 48 and 50 on rollers 30 and 31 and the two crimping tracks 49 and 51 on rollers 30 and 31 as a strip of posts 42 and the strip of solder 40 pass between rollers 30 and 31 along pitch plane 61. Each of the terminal posts is represented by a square 32 which show the cross-sectional area of the post. The position of the posts is perpendicular to the plane of the drawing.

Between the rollers 30 and 31 in the pitch plane 61 it can be seen that the top lands of spur gear teeth 39 of roller 30 coincide angularly with the top lands of the spur gear teeth 38 of roller 31. Similarly, the bottom lands of the teeth 39 of the spur gear teeth 48 coincide generally with the bottom lands of the teeth 38' of spur gear track 50 of roller 31. As stated hereinbefore the bottom land of a spur gear is defined as an area 99 of FIG. 5 whereas the top land is defined as an area 80, also shown in FIG. 5.

Consider specifically the bottom lands 83 and 84 adjacent spur gear teeth 39' and 38'. Trapped within the said bottom lands 83 and 84 is a post 32'. The ridges 19 and 16 of crimping tracks 49 and 51 of rollers 30 and 31 also pass through the pitch plane 61 in coincident angular position to pinch or crimp the strip of solder 40 around the post 32'. Such crimping actually starts before the post 32' enters completely into the pitch plane 61.

For a better understanding of the foregoing statement reference is made to the next approaching post 32'' which is just entering into the pitch plane 61. It can be seen that said post 32'' is in the process of being forced against the strip of solder 40 at the point 85. As the post 32'' continues to be carried around roller 31 in the direction of arrow 86 it will eventually reach the position of post 32', i.e., centered in the pitch plane 61 of FIG. 5. At this time the crimping (and separation from adjacent solder rings) of the solder ring around the post 32' will have been substantially completed. The posts 32' and 32'' will then be carried to the left in FIG. 5 out from between the two rollers 30 and 31 in the direction of arrow 88 as shown in FIG. 5. The posts 32 coming out to the left from between the wheels 30 and 31 in FIG. 5 are surrounded by almost complete solder rings 37 which have been formed from the solder strip 40.

Solder flux 102 from a solder flux source 101 are supplied onto the junction of the solder rings 37 and the posts 32 via capillary action in a narrow slot 100 in feeding element 103 which is connected to source 101.

The purpose of the solder flux is three fold. Firstly, it glues or holds the solder rings onto the terminal posts until assembly and soldering of the posts in a printed circuit board are done. Secondly the flux provides a seal for the surfaces of the solder rings and posts to prevent corrosion or oxidation thereof until solder reflowing occurs. Thirdly, it facilitates the reflow process when the posts and attached solder rings are inserted into a P.C. board and heated to form a solder joint. If glueing is the only function desired, a substance other than solder flux can be employed and then removed during assembly of the posts into a board. For a complete description of a structure which will feed solder flux or some other suitable substance to the posts and solder rings, reference is made to co-pending application Ser. No. 324,720 filed Jan. 18, 1973, by James Ray Coller et al., and entitled "Solder Resist Applying Machine And Method".

It is to be understood that the forms of the invention shown and described herein are but preferred embodiments thereof and that various changes can be made in the detailed structure thereof without departing from the spirit or scope of the invention.

We claim:

1. An apparatus for cold working a continuous strip of solder into at least partial rings around a predetermined portion of each post of a strip of posts spaced apart a given distance and in parallel manner upon a common carrier strip and comprising:
   first and second rollers having parallel axes of rotation and each roller having on the perimeter thereof a plurality of circumferential tracks which are axially aligned with a given portion of the perimeter of the other roller and which approach a tangential relationship with said given portion at the pitch plane between said rollers;
   first and second axially aligned circumferential tracks of said plurality of circumferential tracks on said first and second rollers each comprising a plurality of substantially parallel ridges spaced apart said given distance and having a concave portion therebetween;
   the said ridges on one of said rollers being positioned on said rollers to pass through said pitch plane coincidentally with the ridges on the other of said rollers to crimp said strip of solder which is passed through said pitch plane between said first and second tracks at least partially around said predeterined portions of said posts which are also passed through said pitch plane between said first and second tracks;
   a third track on said first roller comprising gear teeth with one side thereof adjacent a first common side of said first and second track of ridges;
   a fourth track on said second roller comprising gear teeth with one side adjacent the second common side of said first and second track of ridges;
   the gear teeth of said third and fourth tracks being circumferentially positioned with their bottom lands coincident when passing through said pitch plane to thereby trap said predetermined portions of said posts between said one side of said gear teeth of said third and fourth tracks, and with their top lands coincident with said ridges.

2. An apparatus as in claim 1 comprising:
   means for applying solder flux to the junction of said solder and said posts.

3. An apparatus as in claim 1 in which said rollers comprise peripheral means for driving said carrier held strip of posts between said rollers at a predetermined rate and in a parallel relationship with each other and with said roller axes.

4. An apparatus for cold working a continuous strip of solder at least partially around a portion of each of a plurality of parallel posts spaced apart a given distance upon a common carrier strip and comprising:
   first and second rollers with parallel axes and with their perimeters generally axially aligned and approaching a tangential relation along the pitch plane between said rollers;
   first and second axially coincident circumferential tracks on said first and second rollers respectively and each comprising a plurality of parallel ridges spaced apart said given distance and having a concave portion therebetweeen;
   the said ridges on said rollers positioned to pass through said pitch plane coincidentally with each other to crimp said strip of solder at least partially around said posts when both said solder strip and said posts are simultaneously passed between said first and second tracks;
   a third track on said first roller comprising equidistant spaced gear teeth with one side thereof adjacent a first side of said first and second tracks of ridges;
   a fourth track on said second roller comprising equidistant spaced gear teeth with one side adjacent the second side of said first and second tracks of ridges;
   adjacent gear teeth of said third and fourth tracks being angularly positioned to have their bottom lands coincide when passing through said pitch plane to trap said posts between the face and flank surfaces of said gear teeth while said ridges of said first and second tracks are crimping said solder strip partially around said posts at angular positions coincident with said top lands of said gear teeth.

5. An apparatus as in claim 4 comprising:
   means for applying solder flux to the junction of said solder and said posts.

6. An apparatus as in claim 4 in which said rollers comprise peripheral means for driving said carrier held strip of posts between said rollers at a predetermined rate and in a parallel relationship with each other and with said roller axes.

7. An apparatus for cold working a continuous strip of solder at least partially around a portion of each of a plurality of parallel posts spaced apart a given distance upon a common carrier strip and comprising:
   first and second rollers with parallel axes and with their perimeters generally axially aligned and approaching a tangential relation along the pitch plane between said rollers;
   first and second axially coincident circumferential tracks on said first and second rollers respectively and each comprising a plurality of ridges spaced apart said given distance and having a concave portion therebetween;
   the said ridges on said rollers positioned to pass through said pitch plane coincidentally with each other to crimp said strip of solder at least partially around said posts when both said solder strip and said posts are passed simultaneously between said first and second tracks;
   third and fourth tracks on said first and second rollers each comprising equidistant spaced gear-like teeth and positioned adjacent opposite sides of said first and second tracks;

adjacent gear-like teeth of said third and fourth tracks being angularly positioned to have their bottom lands coincide with each other and to be non-coincident with said ridges when passing through said pitch plane to trap said posts between the face and flank surfaces of said gear-like teeth while said ridges of said first and second tracks are crimping said solder strip at least partially around said posts.

8. An apparatus as in claim 7 comprising:
means for applying solder flux to the junction of said solder and said posts.

9. An apparatus as in claim 7 in which said rollers comprise peripheral means for driving said carrier held strip of posts between said rollers at a predetermined rate and in a parallel relationship with each other and with said roller axes.

10. An apparatus for cold working successive portions of a continuous strip of solder around a predetermined portion of each of a plurality of terminal posts spaced apart a given distance and in parallel manner upon a common carrier strip and comprising:

first and second rollers having parallel axes of rotation and each having a plurality of circumferential tracks on the perimeter thereof with each track on each roller coacting with an axially coincident track on the other wheel along the pitch plane between said rollers to perform a predetermined function upon said strip of solder and said terminal posts;

first and second circumferential tracks of said plurality of circumferential tracks on said first and second rollers being axially coincident and each comprising a plurality of ridges positioned thereon and spaced apart said given distance with a concave portion between adjacent ridges;

the said ridges on one of said rollers being angularly positioned on said rollers to pass through said pitch plane coincidentally with the ridges on the other of said rollers to crimp said strip of solder at least partially around said terminal posts when said solder strip and said strip of terminal posts are simultaneously passed through said pitch plane between said first and second tracks;

a third track on said first roller comprising spur-type gear teeth with a first side thereof adjacent a first side of said first and second track of ridges;

a fourth track on said second roller comprising spur-type gear teeth with a first side thereof adjacent the second side of said first and second track of ridges;

adjacent spur-type gear teeth of said third and fourth tracks being circumferentially positioned on said first and second rollers said given distance apart and angularly positioned to have their bottom lands coincide with each other and to have their top lands coincide with said ridges when passing through said pitch plane to thereby trap said predetermined portions of said terminal posts between the face and flank of said spur gear teeth of said third and fourth tracks while said ridges of said first and second tracks are crimping successive portions of said solder strip around said terminal posts.

11. An apparatus as in claim 10 comprising:
means for applying solder flux to the junction of said solder and said terminal posts.

12. An apparatus as in claim 10 in which said rollers comprise peripheral means for driving said carrier held strip of terminal posts between said rollers at a predetermined rate and in a parallel relationship with each other and with said roller axes.

* * * * *